US006381475B1

(12) United States Patent
Kyllönen et al.

(10) Patent No.: US 6,381,475 B1
(45) Date of Patent: Apr. 30, 2002

(54) METHOD AND APPARATUS FOR MENU CONTROLLING

(75) Inventors: Juha Kyllönen; Virpi Säntti, both of Tampere (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/286,721

(22) Filed: Apr. 6, 1999

(30) Foreign Application Priority Data

Apr. 16, 1998 (FI) .................................................. 980842

(51) Int. Cl.[7] .............................................. H04Q 7/32
(52) U.S. Cl. ...................... 455/566; 455/73; 379/93.17; 379/93.19
(58) Field of Search ............... 455/73, 566; 379/93.17, 379/93.19, 433.04

(56) References Cited

U.S. PATENT DOCUMENTS

| 5,138,329 | A |   | 8/1992  | Saarnimo et al. ............ 343/702 |
| 5,168,982 | A |   | 12/1992 | Hakanen et al. ............. 200/342 |
| 5,692,032 | A |   | 11/1997 | Seppanen et al. ............. 379/59 |
| 5,794,142 | A |   | 8/1998  | Vanttila et al. .............. 455/419 |
| 5,845,205 | A |   | 12/1998 | Alanara et al. .............. 455/564 |
| 5,870,683 | A |   | 2/1999  | Wells et al. ................. 455/566 |
| 5,878,351 | A |   | 3/1999  | Alanara et al. .............. 455/466 |
| 5,887,264 | A |   | 3/1999  | Kohler ....................... 455/461 |
| 5,892,475 | A |   | 4/1999  | Palatsi ....................... 345/352 |
| 5,901,222 | A | * | 5/1999  | Macor ........................ 379/433 |
| 6,094,586 | A | * | 7/2000  | Nishiyama et al. ......... 455/566 |
| 6,138,039 | A | * | 10/2000 | Sudo et al. ................. 455/566 |
| 6,154,201 | A | * | 11/2000 | Levin et al. ................ 345/184 |

FOREIGN PATENT DOCUMENTS

| EP | 0 463 856 A3 | 1/1992  |
| EP | 0 588 210 A1 | 3/1994  |
| EP | 0 602 840 A1 | 6/1994  |
| EP | 0 685 953 A1 | 12/1995 |
| EP | 0 715 441 A1 | 6/1996  |
| EP | 0 726 668 A1 | 8/1996  |
| EP | 0 802 658 A2 | 10/1997 |
| EP | 0 817 446 A2 | 1/1998  |
| WO | WO 96/27968  | 9/1996  |
| WO | WO 97/29582  | 8/1997  |
| WO | WO 98/49816  | 11/1998 |

OTHER PUBLICATIONS

Abstract EP 0 755 142.

* cited by examiner

*Primary Examiner*—Daniel Hunter
*Assistant Examiner*—Alan T. Gantt
(74) *Attorney, Agent, or Firm*—Perman & Green, LLP

(57) ABSTRACT

A user interface of a mobile station includes a display, a keyboard, and an operating knob for using menus. Items describing functions of the mobile station are arranged on a menu. The operating knob is in a control and by rotating the operating knob, an item can be selected on the menu. By pushing the operating knob, a function can be carried out and by pulling it, the last implemented function can be undone.

18 Claims, 5 Drawing Sheets

METHOD AND APPARATUS FOR MENU CONTROLLING

FIELD OF THE INVENTION

The present invention relates to the controlling of the functions and settings of mobile stations.

BACKGROUND OF THE INVENTION

The functions and settings of mobile stations can be controlled by means of menus. Typically, the mobile station's display unit presents menus and the first required function/setting can be selected by browsing the menus and then possibly set a required value on it. The menus are often arranged to comply with a tree-like hierarchy at the base of which there are some main branches (main menus) from which the submenus branch, and possibly more submenus can further branch from these.

From this kind of menu, one can select the right function, e.g. by browsing with arrow keys to indicate the right function by a cursor or the menu branch indicating it, and by accepting the choice with an acceptance key. Correspondingly, to return backward in a menu, one can press a undo key or select from the alternatives on the menu "return to the previous level". All the locations on a menu that can be selected can be called menu items.

Proceeding within a menu means moving from the menu on display to a subsequent menu, which can also be called a submenu. Returning at a menu level means an activity opposite to proceeding, where one returns to the previous menu level at which the submenu that was on display has been selected for being displayed.

The development of mobile stations has enabled that, in addition to the traditional features of a mobile phone, new features can be added to the latest mobile stations, such as the Internet's WWW-pages (World Wide Web) type of browsing. It is characteristic of the WWW pages that text and images can be laid out on them and certain parts of the text or images can be used as so-called hyperlinks, which connect the page to another page or another place on the page. Thus, by means of hyperlinks, a user can be directed from one alternative to a completely different page comprising a set of other alternatives. A text comprising hyperlinks is called a hypertext, and such a text is extremely suitable for, e.g. tutorial texts. Thus, the WWW pages are certain kinds of freely laid out menus. In addition, it is possible to place on the WWW pages explanatory text and/or images among the objects to be selected to facilitate the use. The menu items intended for moving from one set of alternatives to another, including hyperlinks, will hereinafter be referred to as links.

A function carried out by a mobile station is, e.g. proceeding in a menu, starting to follow a hyperlink, accepting a set value, sending or receiving electronic mail, retrieving a record located in the mobile station's database or launching a computer program-like application to be carried out by the mobile station. By scrolling, in addition to selecting functions to be carried out from among different alternatives, one can also select a set value by retrieving it from among the permissible values. On the other hand, the cancellation of a function of the mobile station undoes the last carried out function and brings back into effect the preceding situation, such as return to the previous menu level or restores the measure of the set value it had prior to the acceptance of a new value. These functions have previously been controlled, e.g. by numerous pressable keys, such as separate arrow keys, a perform key, and it may have been possible to undo functions by a separate undo key.

Some advantages of the nowadays common user interface of the mobile station presented above are its small size and that it is easy to learn to use it but the use of the mobile station requires a lot of attention from the user for the selection and pressing of the right buttons. This can be particularly difficult in a shaking environment, e.g. in a car when a fellow passenger is using a fixed mobile station during the journey.

SUMMARY OF THE INVENTION

The objective of the present invention is to implement a mobile station that enables a simple and easy control, as regards prior art, of the functions of a mobile station by a user. A mobile station, according to the present invention, comprises first means by which a set of alternatives which can be implemented by said mobile station can be electronically presented to the user and a connecting apparatus the operating knob of which can be moved between a first and a second position and, in said first position of the operating knob, one of said alternatives is implemented and, in said second position of the operating knob, the last function implemented by placing the operating knob in the first position is undid.

When used in a vehicle, the control of a mobile station according to the invention preferably has a rotatable operating knob, the rotating of which scrolls menus or changes the measure of the set value, and which is pushed to accept functions and pulled to undone functions. To implement this, the operating knob is arranged to be gripped with fingers. In this way, the fellow passenger using the operating knob can support his hand on the operating knob, which makes it easier to use the mobile station. It is also easy to connect to the rotatable operating knob separate switches for the pushing and pulling motions, as well as means to measure the angle the operating knob has rotated, e.g. a construction comprising two optoforks and one slotted disc.

It is characteristic of a mobile station, according to the invention, which comprises first means for grouping the functions according to a specific menu hierarchy, the hierarchy comprising a menu level at which there is a minimum of one menu comprising a set of function alternatives, and said set of alternatives comprises two function alternatives at a minimum;

second means for presenting said function alternatives to a user of the mobile station;

and third means for using the menus of the device for carrying out a specific function alternative, that the third means comprise an operating knob that can be moved between a first and a second position, and in said first position, the mobile station is arranged to carry out said specific function alternative, and in said second position, the mobile station is arranged to undo the last implemented function alternative.

It is characteristic of a method for controlling a mobile station, according to the invention, wherein the mobile station's functions are grouped according to a specific menu hierarchy so that it comprises a menu level at which there is a minimum of one menu that has a set consisting of two function alternatives at a minimum, said function alternatives are presented to a user of the mobile station, and wherein the user is allowed to use the menu by means of an operating means for carrying out a specific function alternative, that the operating means is an operating knob, which the user is allowed to move between a first and a second position, and by moving said operating knob into its said first position the user can control the mobile station to carry out said specific function alternative, and by moving said operating knob into its said second position, the user can control the mobile station to undo the last implemented function alternative.

BRIEF DESCRIPTION OF THE DRAWINGS

In the following, the present invention will be discussed in detail by referring to the enclosed drawings, in which.

DETAILED DESCRIPTION

Figure 1A:
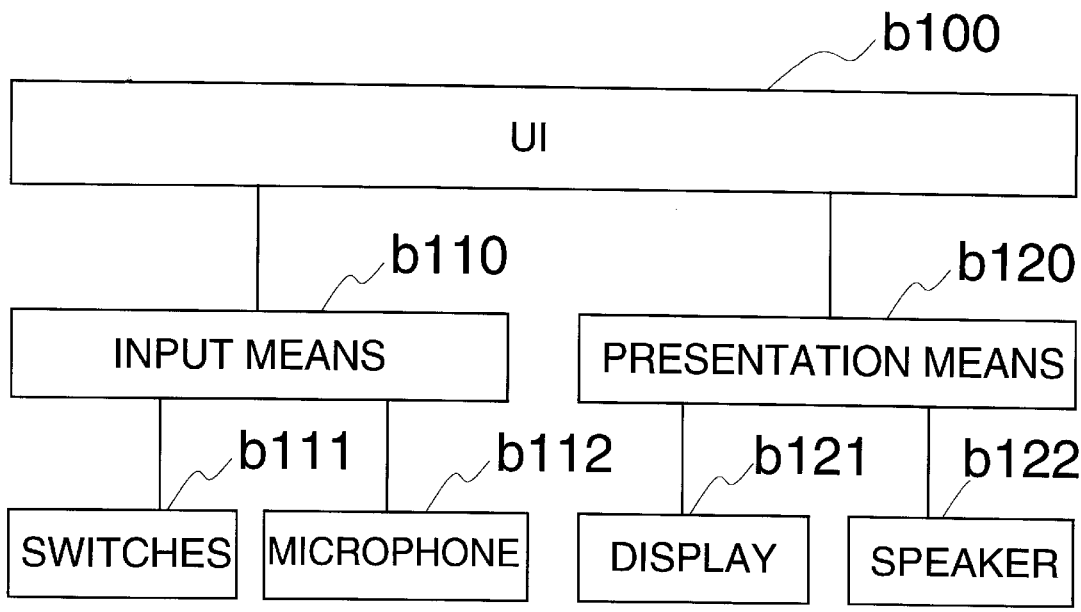
FIG. 1a is a block diagram of the parts of a user interface of a mobile station according to the invention.

FIG. 1a is a block diagram of the parts of a user interface b100 of a mobile station according to the invention. The user interface comprises input means b110 by which the user can input data into the device, and presentation means b120 by which the device presents data to the user. In the mobile station, by way of example, the input means comprise switches b111 which include, e.g. the device's numeric keys and current switch. The presentation means b120 comprise a display unit b121 for displaying text and/or images, for example, a liquid crystal display, as well as a speaker by b122 for sound reproduction. For instance, part of the structured menu construction known in mobile stations or WWW-type hypertext can be presented by the display unit b121. To control the functions of the mobile station, it is possible to present a subset of these functions grouped in a certain manner, as well as links that transfer the presentation to locations on the menu presenting a second subset. When the mobile station is used for data transmission, it is also possible to present alternatives (links) that control the device to open a second page containing required information and possibly more links for being presented to the user.

Figure 1B:
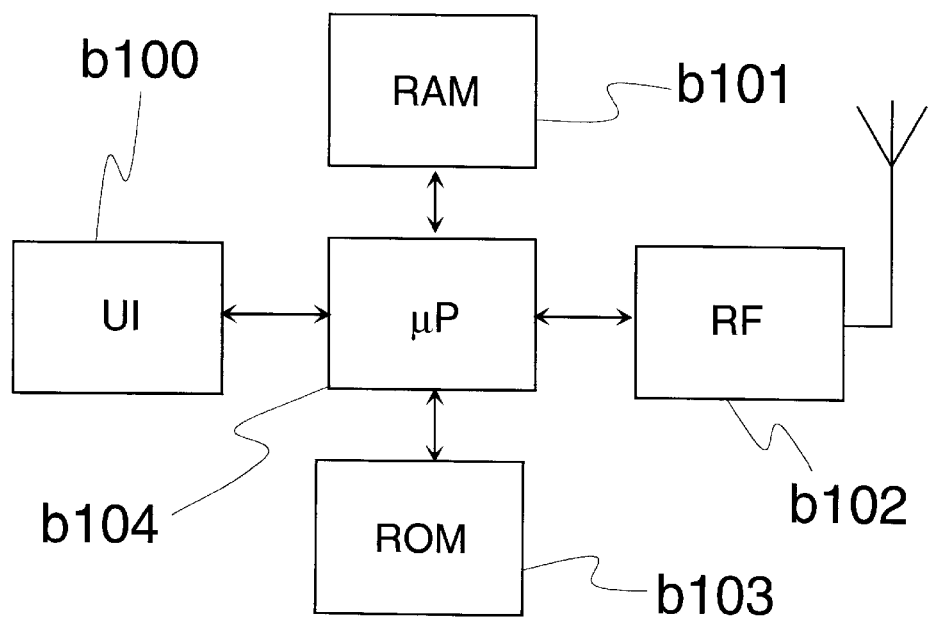
FIG. 1b is a block diagram of the essential parts of a mobile station according to the first embodiment of the invention.

FIG. 1b is a block diagram of the means of a mobile station according to the first embodiment of the invention for presenting menus, reading input and controlling the mobile station. A microprocessor b104 comprised by the mobile station controls the blocks responsible for the mobile station's different functions: a random access memory (RAM) b101, a radio frequency (RF) b102, a read only memory (ROM) b103 and a user interface (UI) b100. The microprocessor's operating instructions, i.e. program and the mobile station's basic menus have been stored in the mobile station in advance, e.g. during the manufacturing process, in the ROM b103. In accordance with its program, the microprocessor uses the RF block b102 for transmitting and receiving messages on the radio path and presents the received messages by the display unit b121 and /or the speaker b122 of the UI b100. The microprocessor monitors the state of the controls b111 and controls the information presented by the presentation means by b120 comprised by the user interface.

When the mobile station is used for presenting information, the mobile station's data transmission features can be used for retrieving new information to the mobile stations' RAM b101 and present the retrieved information, as well as links to other objects by the presentation means. In addition to the visual display, information can be presented as audiophonicly by the speaker b122 in which case the user can control by the controls b111, on the basis of his auditory perception, the microprocessor to implement the mobile station's functions or new data transmissions.

Figure 2:
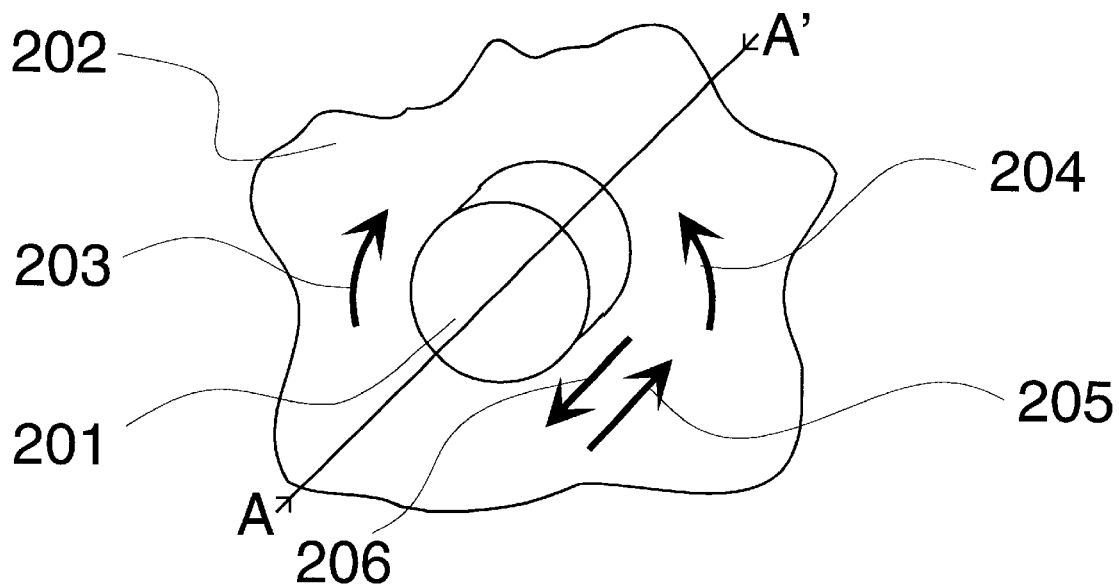
FIG. 2 shows the operating directions of a rotatable control device of a mobile station according to the first embodiment of the invention.

FIG. 2 shows axonometrically the operating directions of an operating knob 201 of a mobile station according to the first embodiment of the invention. The operating knob is attached to the end of a shaft perpendicularly penetrating a cover 202 of the mobile station and for controlling the mobile station, it can be rotated in the direction of the plane of said cover 202 clockwise 203 or counter-clockwise 204, pushed towards the cover in a direction 205 or pulled outwards from the mobile station in a direction 206.

Figure 3:
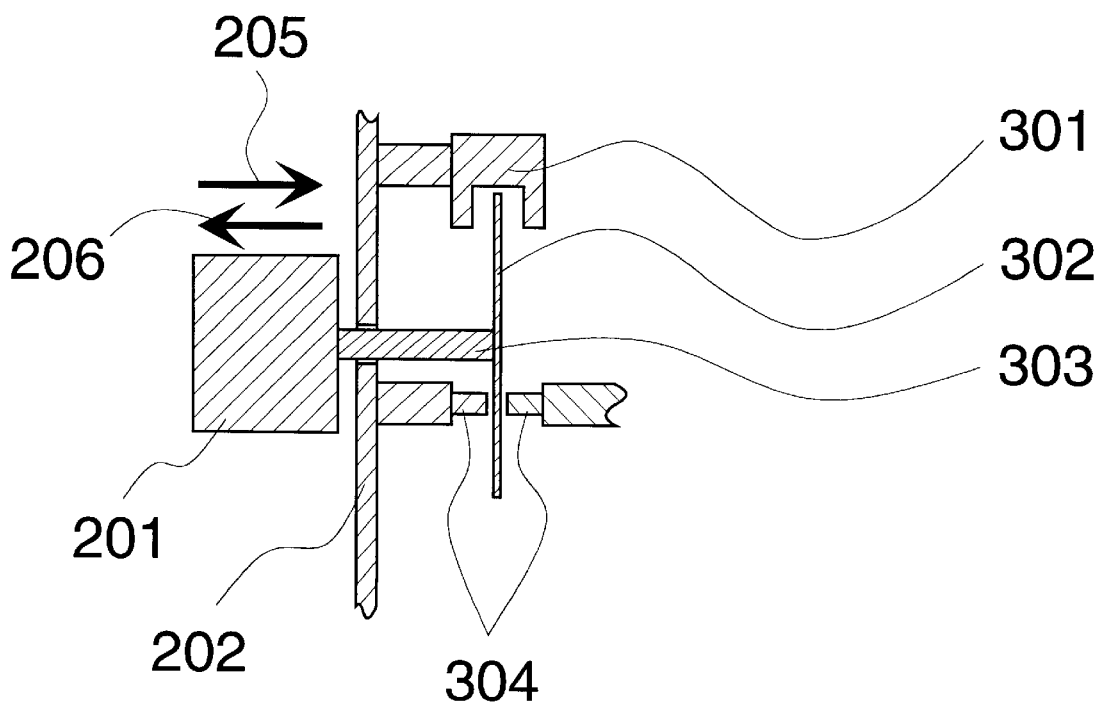
FIG. 3 shows, by way of example, the structure of the control device, shown in FIG. 2, as a section along the line A–A'.
Figure 6:
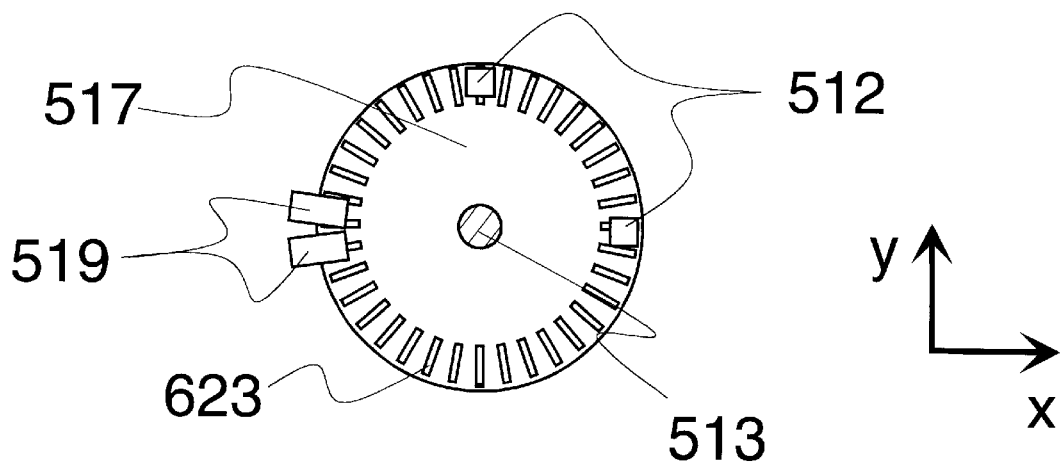
FIG. 6 shows the positioning of a slotted disc, optoforks and microswitches of the control device, shown in FIG. 4, viewed from above with respect to FIG. 4.

FIG. 3 shows the structure of the control device according to the first embodiment of the invention, shown in FIG. 2, as a section along the line A–A'. The control comprising the operating knob 201 has been connected to a slotted disc 302 by a shaft 303. Optoforks 301 have been positioned around the edge of the slotted disc for measuring the rotation of the operating knob 201, as shown in FIGS. 3 and 6. Microswitches 304 have been installed in the centre of the slotted disc 302 on both sides of the slotted disc, the first switch making a contact when the operating knob 201 is pushed against the mobile station in the direction 205 and the second when the operating knob is pulled away from the cover in the direction 206.

Figure 4:
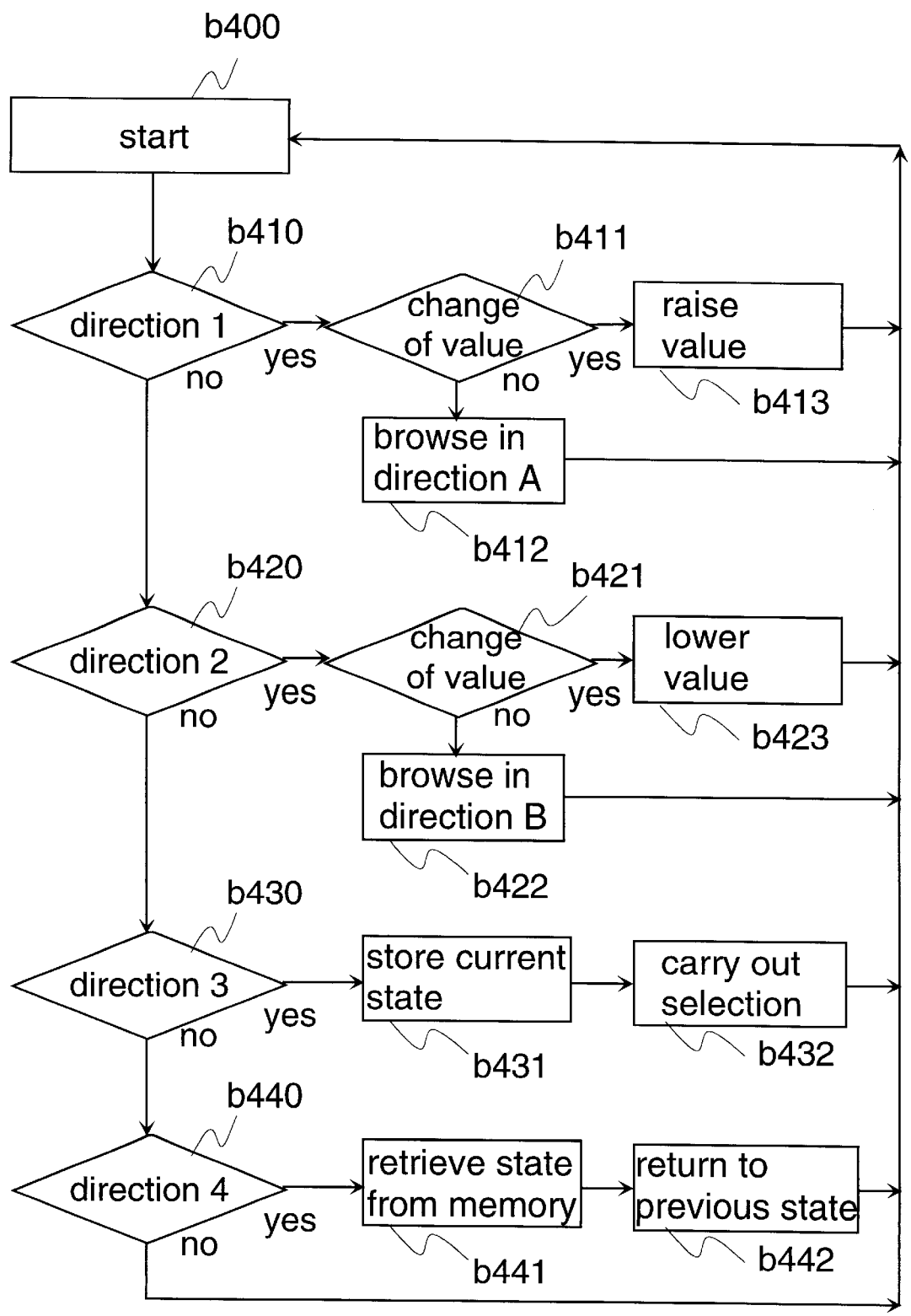
FIG. 4 is a flow diagram of a method according to the invention for using the menus of a mobile station by the mobile station's control device.

FIG. 4 is a flow diagram of a method according to the invention for using the menus of a mobile station by the mobile station's control. The flow diagram begins in a block b400, i.e. start. In the flow diagram's legend, the directions according to the first embodiment of the invention as regards the blocks relating to the movements of the operating knob are in brackets to make it easier to understand the present invention.

In a block b410, it is checked whether the user has made the change in the position of the operating knob 201 in accordance with a direction 1 (e.g. 203) in which case, in a block b411, the cursor on the menu presented by the presentation means b120 is selected to be moved in the selected direction A (e.g. upwards) in a block b412 or the change in the position can be used for controlling the modification of the selected set value. Depending on the state of the modification, by changing the position according to the direction 1, it is possible to move the cursor by the modified figure or character string or change a specific number in the figure/the whole figure or a specific character in the string by selecting the following (e.g. bigger) from the available set. For example, when adjusting the volume of sound, the figure can be raised between 0–10 and when inputting a telephone number, naturally it is more preferable to select each number to be input separately rather than by adding one raise the figure from one to the figure corresponding with the required telephone number.

In a block b420, it is checked whether the user has made the change in the position of the operating knob according to a direction 2 (e.g. 204) in which case, in a block b421, the cursor on a menu presented by the presentation means b120, is selected to be moved in the second selected direction B (e.g. downwards) in a block b422 or the lowering of the selected set value in a block b423 if the set value has been selected for being changed, as described above for the block b410, but in the opposite direction.

In a block b430, it is checked whether the user has made the change in the position of the operating knob according to a direction 3 (e.g. 205) intended for acceptance in which case, in a block b431, the current state of browsing is stored in the RAM b101 and the implementation of the function indicated by the cursor is launched in a block b432.

In a block b440, it is checked whether the user has made the change in the position of the operating knob according to a direction 4 (e.g. 206) intended for cancellation in which case, in a block b441, the state preceding the last implemented function is retrieved from the memory and browsing is changed to conform to it in a block b442. If the modification of the set value was incomplete, the change in the position of the operating knob according to the direction 4 can terminate the modification of the set value or return the modification into a state, where movements made in the directions 1 and 2 move the cursor along the character string being modified. For example, when inputting a character string it is thus possible to shift into a state where the user, by moving the operating knob in the directions 1 and 2, can move the cursor for inputting a new character (letter/number) or to correct a character input earlier.

Figure 5:
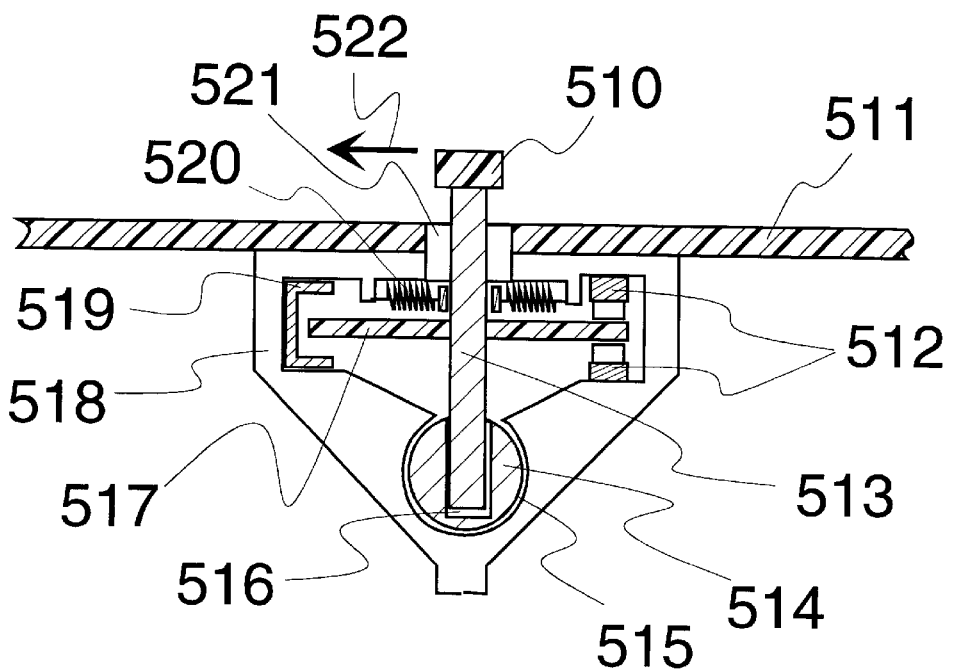
FIG. 5 shows, by way of example, the structure of a rotatable and turnable control device of a mobile station, according to the second embodiment of the invention, as a section viewed from the side.

FIG. 5 shows, as a section viewed from the side, the structure of a control, according to the second embodiment of the invention, which can be moved sideways in four different directions, rotated in two directions, pulled and pushed. Thus, the position of such an operating knob can be changed in eight different directions, whereupon part of the degree of freedom of the operating knob can be used separated from browsing for adjusting or controlling the mobile station's functions, e.g. for setting the volume of sound or opening a phonebook or establishing a communication connection.

A groove 521 has been shaped on a cover 511 of the mobile station. A frame 518 of the control has been fixed inside the mobile station cover concentrically with the groove 521 hence forming an enclosed space with the cover. A ball-shaped recess 515 has been shaped on the cover, also concentrically with the groove 521, near the wall opposite to the frame cover. A ball 514 having a straight hole 516 through its centre nearly penetrating the ball has been placed inside the recess 515. An operating knob 510 which is outside the mobile station cover has been attached to a shaft 513 penetrating the groove 521, and the other end of the shaft is in the hole 516. A slotted disc 517 that fits well inside the frame has been attached to the shaft in the shaft normal plane. Two optoforks 519 located near each other have been attached to the frame on the side of the slotted disc reaching over its edges, as shown below in FIG. 6. In addition, two groups of two microswitches 512 have been attached to the frame at an angle of 90° with respect to one another, level with the slotted disc.

Figure 7:
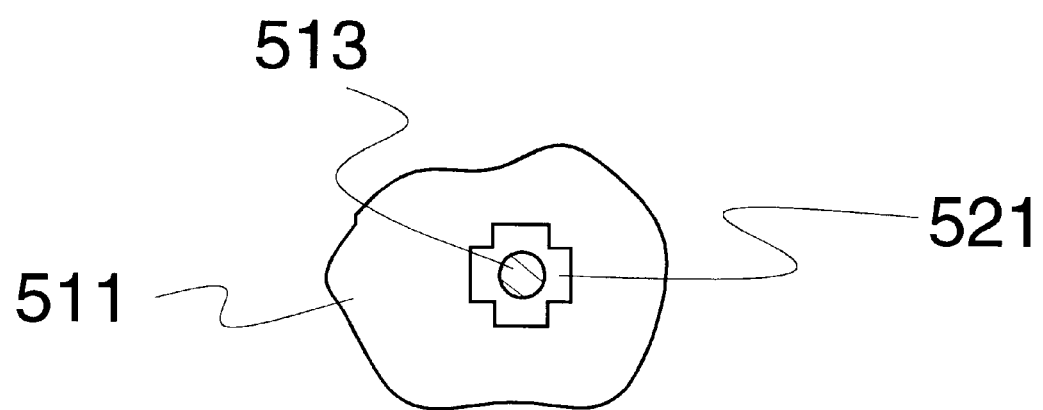
FIG. 7 shows a groove that belongs to the cover of a mobile station comprising the control device, shown in FIG. 4, viewed from above with respect to FIG. 4.

In both groups, the microswitches are positioned so that they are near the outer rim of the slotted disc facing one another on the opposite sides of the slotted disc level. The microswitches lightly touch the opposite levels of the slotted disc and their springs support the slotted disc 517 and the shaft 513 attached thereto in the direction of the shaft so that a small clearance is left both between the operating knob 510 and the cover 511 and one end of the shaft and the bottom of the hole 516. The shaft 513 is supported by springs 520 from the upper edge of the frame 518 so that it centres itself in the centre of the groove 521. The groove 521, the slotted disc 517, the optoforks 519, the microswitches 512, the shaft 513, and the hole 516 are dimensioned and positioned so that the operating knob can be moved parallel to the shaft, as well as in four directions opposite to the shaft, deviating by 90 degrees from one another so that, by each movement, one or two simultaneous contacts are made in the microswitch groups 512. The cross-shaped groove 521 made on the mobile station's cover 511, shown in FIG. 7, prevents the operating knob's connected shaft 513 from being moved diagonally with respect to axis x and y shown in FIG. 6 and, thus, only one microswitch group should make a contact by one microswitch at a time when the operating knob is moved in the direction of the cover 511 and the microprocessor can then conclude on the basis of these contacts of the microswitches in which direction the operating knob is being moved and use this information to control the mobile station.

With further reference to FIG. 5; the pulling of the operating knob 510 presses, through the shaft and the slotted disc, the two microswitches located on the operating knob's side which indicates the pulling movement to the microprocessor b104. Correspondingly, the pushing of the operating knob presses the other two microswitches indicating the pushing movement of the operating knob to the microprocessor. The optoforks indicate the rotating movement of the operating knob to the microprocessor and the turning of the operating knob can be concluded on the basis of the microswitch making the contact one at a time. For example, the turning of the operating knob in a direction 522 slightly turns the system formed by the shaft and the slotted disc, whereupon the right edge of the slotted disc on the side of the microswitch group, illustrated in FIG. 5, ascends and presses the upper microswitch in the group. A movement made in the opposite direction would press the opposite microswitch in the same microswitch group. FIG. 5 has been simplified by only drawing one optofork 519 and one microswitch group 512.

FIG. 6 shows the positioning of the optoforks 519 (301) located next to each other, shown in FIGS. 5 and 3, in relation to the slotted disc 517 (302) and the shaft 513 (303) viewed from above with respect to FIG. 4. When the shaft 513 (303) and the slotted disc attached to it are rotated by the operating knob 510 (201), slots 623 of the slotted disc advance through the optoforks establishing in the optoforks a number of connections equivalent to the number of the slots. When the optoforks are arranged suitably the microprocessor b104 is able to define how much and in which direction the operating knob 510 (201) has been rotated. FIG. 6 also shows the positioning of the two groups 512 both consisting of two microswitches according to the second embodiment of the invention, as shown in FIG. 5.

Said rotatable operating knob's cancellation function, acceptance function or both can also be implemented by turning or pushing the operating knob in a certain direction at least approximately perpendicularly to the operating knob's rotation axis. If the operating knob's rotation axis is selected to be parallel to the cover of the mobile station, the cancellation function, acceptance function or both can be carried out by pushing the operating knob on its opposite sides in the direction of its rotation axis.

The present invention can also preferably be used in a mobile station, wherein the alternatives are presented to a user using digitised sound, whereupon the user does not necessarily have to look at the display unit. As necessary, the user can be informed of the changes in the position of the control according to the invention by means of sound expressed by the mobile station. In this case, the user receives by means of his auditory sense a confirmation of the acceptance or cancellation of a function or how far one has proceeded in the area being browsed at any given time while making the choice. In this way, it is possible to further reduce the user's need to follow with his eyes the mobile station or the display unit it operates. This kind of one-way sound-using system, wherein the input is given mechanically, is not susceptible to interference in the form of noise and it is much more economical to implement and possibly faster to use than a completely acoustically operating system utilising, e.g. speech recognition.

If one wants to prevent dirt from getting inside the cover of the mobile station, it is preferred that a stick control be used as the operating knob where the movements of the outer head of the elongated stick made in one direction and in the direction opposite to it, in a plane perpendicular to the stick, control browsing or the changing of a set value and, in the same plane, a movement essentially perpendicular to these directions made in one direction accepts a function and a movement opposite to this direction undoes the last acceptance. An opening arranged on the cover of the mobile station for this kind of stick can be packed by coating the stick with rubber and by also extending the rubber layer over the opening on the mobile station's cover or by using suitable rubber bellows. Alternatively, such a model of the stick control can be used where acceptance and cancellation are made by pushing and pulling the stick in the direction of its longitudinal axis, whereupon the movements of the head of the stick in the direction of two axes perpendicular to one another, in a plane perpendicular to the stick, can be used for browsing. In case the stick is installed in a horizontal plane these axes are in the horizontal and vertical directions.

By means of the present invention, the user can by moving the operating knob in the direction 1 or 2 scroll the alternatives shown by the display unit upwards or downwards one line at a time. From one edge of the display unit, a new line appears and at the opposite edge, one line may disappear. The indication can be implemented, e.g. by displaying a menu bar on one alternative, the menu bar being a rectangle of one colour inside of which the text is displayed in complementary colours. It is not necessary to have more than one line corresponding to the alternatives on display at a time. Those started with an acceptance function will have a function according to the alternative indicated at a time. Whereas for carrying out a cancellation function, e.g. by pulling the operating knob, it is not necessary to present a separate alternative to the user on the display unit.

For allowing moving from one menu level to another, it is possible to display among the alternatives the names of submenus, which function as links to these menus containing other alternatives.

The invention provides a handy solution for the user interface of a mobile station. The user can easily find the operating knob even without looking and move it in the required directions, whereupon it is not necessary to continuously pay attention to choosing the right buttons and holding one's hand on them. A preferred place for a mobile station according to the invention is a car, where the mobile station is installed, e.g. on the car's front panel. By means of the invention, an easily controlled control is achieved although, e.g. a safety belt or the position of a seat may force a passenger using the mobile station to stretch his arm to reach the controls of the mobile station. Push buttons according to prior art easily slip out of the user's hand or his hand moves from them particularly if he is in a shaking environment, as in a car. In addition, the user's hand becomes easily tired in this kind of situation but it helps when the user can get hold of the operating knob and, thus, support his hand on it and by means of the rotatable operating knob according to the invention, it is possible to gain fast control of the mobile station.

An additional advantage that can be achieved by a mobile station and a method for using menus according to the invention is the facilitation of the assembly and installation in fixtures or a vehicle due to the decrease in the number of buttons needed to use the mobile station.

The use of the direction of the operating knob opposite to acceptance preferably for undoing an erroneous function or input represents the kind of intuitiveness that essentially facilitates the use of a device according to the invention. Pulling the operating knob, which is used with a single grip, outwards from the device when an error occurs is a fast and easy way to undo the erroneous input compared with traditional solutions.

This paper presents the implementation and embodiments of the present invention with the help of examples. It is obvious to a person skilled in the art that the present invention is not restricted to details of the embodiments presented above, and that the invention can also be implemented in another form without deviating from the characteristics of the invention. The embodiments presented should be considered illustrative, but not restricting. Thus, the possibilities of implementing and using the invention are only restricted by the enclosed patent claims. Consequently, the various options of implementing the invention as determined by the claims, including the equivalent implementations, also belong to the scope of the invention.

What is claimed is:

1. A mobile station, which comprises:
   first means for grouping functions in accordance with a specific menu hierarchy, the hierarchy comprising a menu level having a minimum of one menu comprising a set of function alternatives and said set of alternatives comprising two function alternatives at a minimum;
   second means for presenting said function alternatives to a user of the mobile station;
   and third means for using the menus of the device for carrying out a specific function alternative, wherein
   the third means comprise an operating knob, which can be moved in different positions including movement between a first and second position, and the mobile station comprises:
   a memory for storing a current state of the mobile station in each position of the operating knob, and
   in said first position, the mobile station is arranged to carry out said specific function alternative of said set of function alternatives of said menu, and
   in said second position, the mobile station is arranged to undo the last implemented function alternative by retrieving from the memory the state of the mobile station preceding the last implemented function alternative of said set of function alternatives of said menu and by returning to the retrieved state.

2. A mobile station according to claim 1, wherein the function alternative is one of the following: a function intended for utilising the features of the mobile station, a setting affecting the operation of the mobile station, and a link directing from one set of alternatives to another.

3. A mobile station according to claim 1, wherein said second means for presenting the function alternatives to the user comprise at least one of the following: a display unit, a speaker, and speech synthesis apparatus for presenting speech information.

4. A mobile station according to claim 1, wherein said operating knob has a normal position between said first and second positions, whereto the operating knob is arranged to return by itself after the user releases his grip of the operating knob.

5. A mobile station according to claim 1, wherein
the movement of said operating knob between the first and second positions is carried out in the direction of a shaft of the operating knob, and
said first position is one position between the operating knob's positions when pushed in and pulled out, and
correspondingly said second position is the other position between the operating knob's positions when pushed in and pulled out, but different to the first position.

6. A mobile station according to claim 1, wherein said operating knob can also be moved between a third and fourth position for browsing said function alternatives.

7. A mobile station according to claim 6, wherein the moving of said operating knob between the third and fourth positions is the rotating of the operating knob clockwise and counter-clockwise.

8. A mobile station according to claim 6, wherein at least part of said positions of the operating knob are implemented by moving the operating knob against its shaft.

9. A mobile station according to claim 1, wherein said mobile station is intended for being installed in a car.

10. A method for controlling a mobile station, wherein the functions of the mobile station are grouped in accordance with a specific menu hierarchy so that it comprises a menu level with a minimum of one menu, the menu having a set consisting of at least two function alternatives, said function alternatives being presented to a user of the mobile station, and wherein the user is allowed to use the menu by an operating means for carrying out a specific function alternative, wherein
the operating means is an operating knob, which the user can move to different positions including movement between a first and second position, and a current state of the mobile station being associated with each position of the operating knob,
by moving said operating knob into its said first position, the user can control the mobile station to carry out said specific function alternative of said set of function alternatives of said menu, and
by moving said operating knob into its said second position, the user can control the mobile station to undo the last implemented function alternative by retrieving from the memory the state of the mobile station preceding the last implemented function alternative of said set of function alternatives of said menu and by returning to the retrieved state.

11. A method according to claim 10, wherein the function alternative is one of the following: a function intended for utilising the features of the mobile station, a setting affecting the operation of the mobile station, and a link directing from one set of alternatives to another.

12. A method according to claim 10, wherein the manner of presenting the function alternatives to the user comprise at least one of the following: a display unit, a speaker, and speech synthesis apparatus for presenting speech information.

13. A method according to claim 10, wherein said operating knob has a normal position between said first and second positions, whereto the operating knob is arranged to return by itself after the user releases his grip of the operating knob.

14. A method according to claim 10, wherein
the movement of said operating knob between the first and second positions is carried out in the direction of a shaft of the operating knob, and
said first position is one position between the operating knob's positions when pushed in and pulled out, and correspondingly said second position is the other position between the operating knob's positions when pushed in and pulled out, but different to the first position.

15. A method according to claim 10, wherein said operating knob can also be moved between a third and fourth position for browsing said function alternatives.

16. A method according to claim 15, wherein the moving of said operating knob between the third and fourth positions is the rotating of the operating knob clockwise and counter-clockwise.

17. A method according to claim 15, wherein at least part of said positions of the operating knob are implemented by moving the operating knob against its shaft.

18. A method according to claim 10, wherein said mobile station is installed in a car.

* * * * *